US009855856B2

(12) United States Patent
Patana (10) Patent No.: US 9,855,856 B2
(45) Date of Patent: Jan. 2, 2018

(54) DYNAMIC BATTERY LOADING FOR ELECTRIC VEHICLES

(71) Applicant: Microsoft Technology Licensing, LLC, Redmond, WA (US)

(72) Inventor: Tero Patana, Lynnwood, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 44 days.

(21) Appl. No.: 15/009,691

(22) Filed: Jan. 28, 2016

(65) Prior Publication Data

US 2017/0217329 A1 Aug. 3, 2017

(51) Int. Cl.
*H02P 27/00* (2006.01)
*B60L 11/18* (2006.01)

(52) U.S. Cl.
CPC ....... *B60L 11/1877* (2013.01); *B60L 11/1861* (2013.01); *B60L 11/1872* (2013.01)

(58) Field of Classification Search
CPC .............................. H02P 27/00; H02P 31/00
USPC ............... 318/471, 478, 479, 494, 500, 504
See application file for complete search history.

(56) References Cited

U.S. PATENT DOCUMENTS

| 3,917,017 | A | * | 11/1975 | Deane | B60L 11/126 180/65.245 |
| 4,101,787 | A | * | 7/1978 | Vail | B60L 11/1805 307/81 |
| 4,131,833 | A | * | 12/1978 | McAuliffe | H02P 7/14 307/81 |
| 6,049,141 | A | | 4/2000 | Sieminski et al. | |
| 6,316,914 | B1 | * | 11/2001 | Bertness | G01R 31/3627 320/134 |
| 7,830,117 | B2 | | 11/2010 | Ambrosio et al. | |
| 7,940,028 | B1 | | 5/2011 | Hermann | |
| 8,508,191 | B2 | | 8/2013 | Kim et al. | |
| 8,532,854 | B2 | | 9/2013 | Tate et al. | |
| 8,692,507 | B2 | | 4/2014 | Chen | |
| 8,866,441 | B2 | | 10/2014 | Weng et al. | |
| 9,065,280 | B2 | | 6/2015 | Workman et al. | |

(Continued)

FOREIGN PATENT DOCUMENTS

EP 2562030 A2 2/2013
WO 2009108565 A2 9/2009

(Continued)

OTHER PUBLICATIONS

Samuel, Ashwin Victor, "Energy management system for a hybrid electric vehicle", In Doctoral dissertation, Lamar University-Beaumont, Retrieved on: Nov. 13, 2015, 2 pages.

(Continued)

*Primary Examiner* — Bentsu Ro
(74) *Attorney, Agent, or Firm* — Schwabe, Williamson & Wyatt P.C.

(57) ABSTRACT

A system for dynamic battery loading for electric vehicles includes an electric motor to displace a vehicle. A first battery stores a first electric power charge and a second battery stores a second electric power charge. A controller dynamically loads or couples the first battery or the second battery to deliver the first electric power charge or the second electric power charge, respectively, to the electric motor based at least in part on the power signal, a location of the first battery, or a location of the second battery within the vehicle.

16 Claims, 5 Drawing Sheets

(56) References Cited

U.S. PATENT DOCUMENTS

| | | |
|---|---|---|
| 2005/0139399 A1 | 6/2005 | Gopal |
| 2012/0038314 A1 | 2/2012 | Stewart et al. |
| 2014/0265604 A1 | 9/2014 | Mergener |
| 2015/0283913 A1 | 10/2015 | Chemin et al. |
| 2015/0309547 A1 | 10/2015 | Huang et al. |

FOREIGN PATENT DOCUMENTS

| | | |
|---|---|---|
| WO | 2009128082 A1 | 10/2009 |
| WO | 2013186209 A2 | 12/2013 |

OTHER PUBLICATIONS

"International Search Report and Written Opinion Issued in PCT Application No. PCT/US2017/013629", dated Apr. 24, 2017, 15 Pages.

* cited by examiner

DYNAMIC BATTERY LOADING FOR ELECTRIC VEHICLES

BACKGROUND

New vehicle designs may be powered, at least part of the time, with electrical energy. These new vehicle designs may include electric vehicles (EVs) that rely solely on electrical energy—typically from batteries—to power electric motors that supply torque to a set of drive wheels. Hybrid electric vehicles (HEVs) may alternately use an electric motor or an internal combustion gasoline engine to propel the vehicle. HEVs may switch between the electric motor and the internal combustion gasoline engine depending on a variety of factors or conditions including desired fuel economy.

EVs and HEVs include one or more rechargeable high voltage batteries to store and deliver the substantial electrical energy necessary to drive the electric motor that, in turn, drives the vehicle's wheels to displace the vehicle.

BRIEF DRAWINGS DESCRIPTION

The present disclosure describes various embodiments that may be understood and fully appreciated in conjunction with the following drawings.

DETAILED DESCRIPTION

The present disclosure describes embodiments with reference to the drawing figures listed above. Persons of ordinary skill in the art will appreciate that the description and figures illustrate rather than limit the disclosure and that, in general, the figures are not drawn to scale for clarity of presentation. Such skilled persons will also realize that many more embodiments are possible by applying the inventive principles contained herein and that such embodiments fall within the scope of the disclosure which is not to be limited except by the claims.

The present disclosure may interchangeably use the terms "battery," "cell," "battery cell," and "battery pack." The terms "battery," "cell," "battery cell," or "battery pack" may refer to a single battery or to one or more individual batteries that are electrically interconnected to achieve the desired voltage and capacity for a particular application, the individual batteries typically contained within a single piece or multi-piece housing. The present disclosure may interchangeably use the terms "power system" and "battery system" to refer to an electrical energy storage system that has the capability to be charged and discharged such as a battery or battery pack.

The present disclosure may interchangeably use the terms "load," "couple," and "connect" to indicate an electrical coupling between e.g., a battery and an electrical motor as explained in more detail below.

Figure 1A:
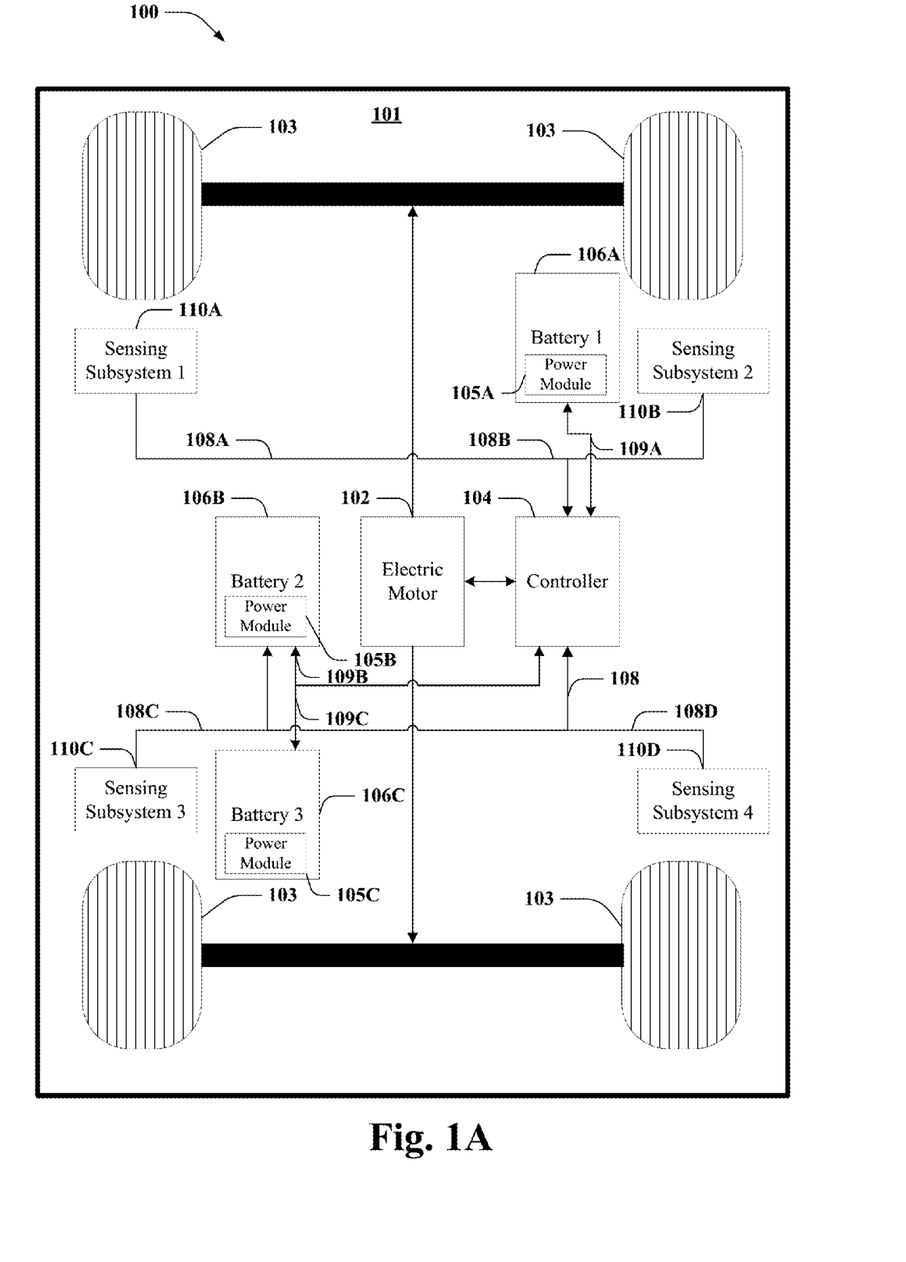
FIG. 1A diagrams an embodiment of a system to dynamically load or couple a battery to an electric motor according to the present disclosure.

FIG. 1A diagrams an embodiment of a system 100 to dynamically load or couple a battery to an electric motor 102 according to the present disclosure. Referring to FIG. 1A, system 100 may refer to any electric vehicle system including either an all-electric vehicle (EV) or a hybrid electric vehicle (HEV), plug in or otherwise, that uses multiple propulsion sources, e.g., both an electric motor and an internal combustion gasoline engine.

System 100 may include an electric motor 102 that may convert electrical energy received by at least one of batteries 106A, 106B, or 106C into mechanical energy to propel wheels 103 of vehicle 101. Electric motor 102 may be any kind of electric motor operating on any known physical principles known to a person of ordinary skill in the art, e.g., magnetic, electrostatic, piezoelectric, or the like.

System 100 may include a single battery, e.g., battery 106A, or a plurality of batteries, e.g., batteries 106A, 106B, and 106C depending on many factors including cost, ease of manufacturing, ease of access for charging, ease of service, ease of replacement, battery capacity, battery size, vehicle size, vehicle weight, vehicle range, vehicle wiring, and the like. Batteries 106A, 106B, or 106C may each be located at a different location within vehicle 101. For example, in one embodiment, battery 106A may located at a forward location within vehicle 101 while batteries 106B and 106C may be located at a rear and center location, respectively, within vehicle 101. Battery 106B may be located in close proximity to battery 106C and batteries 106B and 106C may be located relatively distant from battery 106A within vehicle 101. A person of ordinary skill in the art should understand that the location of batteries 106A, 106B, or 106C within vehicle 101 may depend on many factors including cost, ease of manufacturing, ease of access for charging, ease of service, ease of replacement, battery capacity, battery size, vehicle size, vehicle weight, vehicle range, vehicle wiring, and the like.

Batteries 106A, 106B, or 106C may provide electrical energy over sustained time periods and may be characterized by their relatively high power-to-weight ratio, energy-to-weight ratio, and energy density. Lighter batteries may reduce the weight of vehicle 101 and generally improve performance in some instances. Batteries 106A, 106B, and 106C may include any battery type known to a person of ordinary skill in the art including lead-acid, nickel metal hydride, sodium, lithium ion, and the like.

Figure 1B:
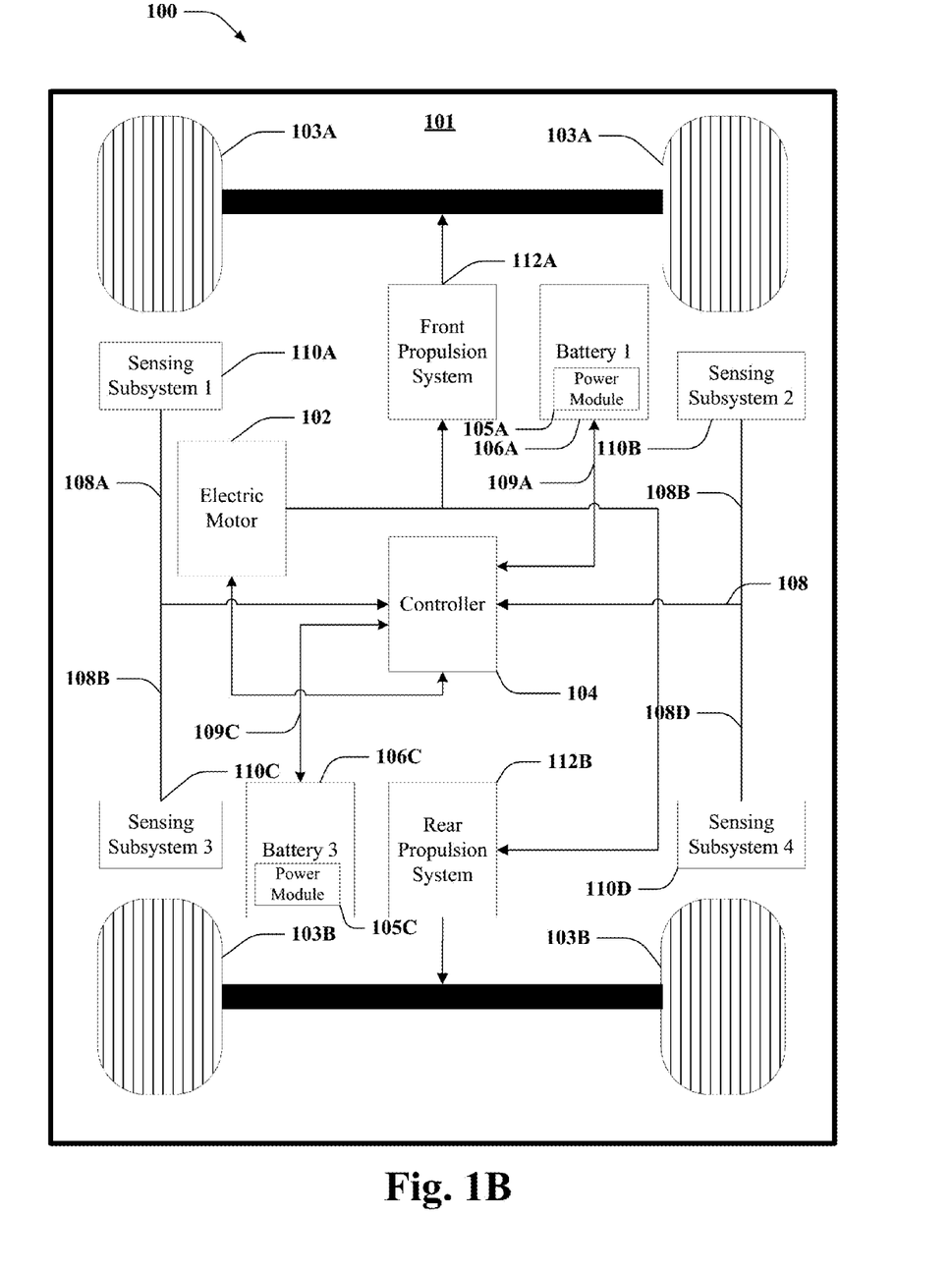
FIG. 1B diagrams another embodiment of a system to dynamically load or couple a battery to an electric motor according to the present disclosure.

Batteries 106A, 106B, or 106C may include corresponding power modules 105A, 105B, or 105C that load, couple, connect, or otherwise provide the high current electrical power sourced from the batteries 106A, 106B, or 106C to electric motor 102 in response to control signals 108 from controller 104. To do so, power modules 105A, 105B, or 105C may include any number or type of relays or switches as is well known to a person of ordinary skill in the art. In an embodiment, power modules 105A, 105B, or 105C may be part of each battery 106A, 106B, or 106C as shown in FIGS. 1A and 1B. In another embodiment, a centralized single power module (not shown separately from power modules 105A, 105B, or 105C) may be coupled to batteries 106A, 106B, or 106C and to electric motor 102 to load, couple, connect, or otherwise provide the high current electrical power sourced from the batteries 106A, 106B, or 106C to electric motor 102.

Batteries 106A, 106B, or 106C may be recharged in any manner known to a person of ordinary skill in the art. In an embodiment, batteries 106A, 106B, or 106C may be recharged using a charging outlet connected to the power grid accessed either at home or at a recharging station for a fee. Batteries 106A, 106B, or 106C may take a predetermined amount of time, e.g., several hours, to recharge fully depending on a variety of factors including power delivered to the charging outlet. For example, a household outlet with a 110 volt supply may deliver 1.5 kilowatts while a commercial outlet with a 240 volt supply may deliver 3 kilowatts, which will charge batteries 106A, 106B, or 106C in substantially less time than it would take to charge batteries 106A, 106B, or 106C using a 110 volt household outlet. Batteries 106A, 106B, or 106C may be recharged using any coupling mechanism known to a person of ordinary skill in the art, e.g., inductive coupling or conductive coupling.

A controller 104 may dynamically or selectively load or couple at least one of batteries 106A, 106B, or 106C to electric motor 102 based at least in part on sensing signals 108A, 108B, 108C, or 108D. Sensing subsystems 110A, 110B, 110C, or 110D may include sensors and other electronic or logic circuitry to determine a variety of operating conditions for system 100 as explained in more detail below. In an embodiment, controller 104 may dynamically select battery 106A to deliver electrical energy to electric motor 102 based on receiving a sensing signal 108A that represents certain operating conditions, e.g., a first level of vehicle acceleration. Controller 104 may then dynamically change the selection of battery 106A to battery 106B to delivery electrical energy to electric motor 102 based on receiving sensing signal 108A that represents a change in operating conditions, e.g., a second level of vehicle acceleration. Controller 104 may dynamically or selectively load or couple batteries 106A, 106B, or 106C to electric motor 102 based on any single sensing signal 108A, 108B, 108C, or 108D, or any combination of sensing signals 108A, 108B, 108C, or 108D. In an embodiment, controller 104 may dynamically or selectively load or couple batteries 106A, 106B, or 106C to electric motor 102 based on signals received directly from electric motor 102.

In an embodiment, controller 104 may generate control signals 109A, 109B, or 109C and provide control signals control signals 109A, 109B, or 109C to power modules 105A, 105B, and 105C in batteries 106A, 106B, and 106C, respectively. Doing so may enable power modules 105A, 105B, or 105C to load or couple electrical energy from corresponding batteries 106A, 106B, or 106C to electric motor 102 based on sensing signals 108A, 108B, 108C, or 108D.

Controller 104 may dynamically or selectively load or couple batteries 106A, 106B, or 106C to electric motor 102 to account for near instantaneous changes in operating conditions as reflected in near instantaneous changes to the any of the sensing signals 108A, 108B, 108C, or 108D. Controller 104 may monitor sensing signals 108A, 108B, 108C, or 108D to detect operating condition changes in near instantaneous manner, e.g., synchronized to a system clock or other high frequency circuitry, or at predetermined periods.

Controller 104 may dynamically or selectively load or couple a single one of batteries 106A, 106B, or 106C or any combination of batteries 106A, 106B, or 106C based at least in part on any one or a combination of sensing signals 108A, 108B, 108C, or 108D.

FIG. 1B diagrams another embodiment of a system 100 to dynamically load or couple a battery to electric motor 102 according to the present embodiment. Like reference numerals refer to like structures or elements in the drawings. Referring to FIGS. 1A and 1B, electric motor 102 may drive a front propulsion system 112A, a rear propulsion system 112B, or a combination of front and rear propulsion systems 112A and 112B, respectively, depending on a variety of operating conditions for vehicle 101. For example, under certain road conditions, it may be desirable for electric motor 102 to propel vehicle 100 using only front propulsion system 112A. In this case, controller 104 may dynamically or selectively load or couple battery 106A or battery 106C, or both batteries 106A and 106C to provide electrical energy to electric motor 102 to drive front propulsion system 112A. Under certain other road conditions, it may be desirable for electric motor 102 to propel vehicle 100 using both front propulsion system 112A and rear propulsion system 112B. In this case, controller 104 may dynamically or selectively load or couple battery 106A or battery 106C, or both batteries 106A and 106C, to provide electrical energy to electric motor 102 to drive both front propulsion system 112A and rear propulsion system 112B. Controller 104 may dynamically or selectively load or couple batteries 106A, 106B, or 106C based at least in part on sensing control signals 108A, 108B, 108C, or 108D generated by sensing subsystems 110A, 110B, 110C, and 110D, respectively.

Vehicle 101 may include sensing subsystems 110A, 110B, 110C, and 110D to generate sensing control signals 108A, 108B, 108C, and 108D that are representative of any number or type of operating condition for vehicle 101. Vehicle 101 is shown with four sensing subsystems 110A, 110B, 110C, and 110D but a person of ordinary skill in the art should understand that this is for simplicity only and that any number of sensing subsystems may exist.

Figure 2:
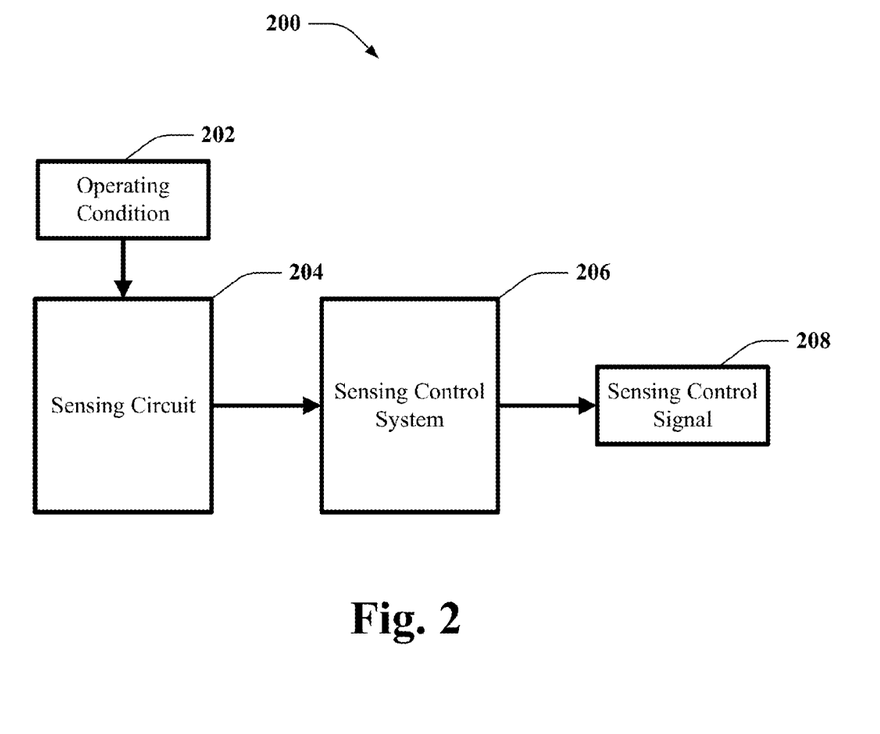
FIG. 2 diagrams an embodiment of a sensing subsystem according to the present disclosure.

FIG. 2 diagrams an embodiment of a sensing subsystem 200 according to the present disclosure. Referring to FIGS. 1A, 1B, and 2, sensing subsystem 200 may include a sensing circuit 204 to sense an operating condition 202 of vehicle 101, e.g., acceleration, and a sensing control system 206 to generate a sensing control signal 208 based at least in part on the operating condition 202. In an embodiment, sensing circuit 204 may include sensors and other circuitry to sense or determine operating condition 202. A person of ordinary skill in the art should recognize that sensing circuit 204 may include any number or type of sensors or other circuitry to determine operation condition 202, including temperature sensors, acceleration sensors, cameras, collision avoidance systems, parking or proximity sensors, global positioning systems, throttle position sensors, battery charge circuitry, tire pressure and wear sensors, fluid level sensors, and the like. A person of ordinary skill in the art should recognize that operating condition 202 of vehicle 101 may include any known operating condition for a vehicle, e.g., speed, acceleration, road conditions—uphill, downhill, level, road surface condition, road material, road slickness, ice, and the like—, and environmental conditions—ambient temperature, humidity, ice, and the like—. Operating condition 202 may additionally refer to location of batteries 106A, 106B, or 106C within vehicle 101, distance of batteries 106A, 106B, or 106C to motor 102, availability of charging stations, charging level of batteries 106A, 106B, or 106C, and the like. A person of ordinary skill in the art should recognize that operating condition 202 may refer to any condition of any element of vehicle 101, e.g., electric motor 102 and propulsion systems 112A and 112B, as well as any condition on which vehicle 101 may interact including the environment, road conditions and types, and the like.

Controller 104 may dynamically or selectively determine which of batteries 106A, 106B, or 106C, or which combination of batteries 106A, 106B, or 106C, to load or couple to motor 102 based, at least in part, on having determined the location of batteries 106A, 106B, 106C in vehicle 101. Batteries 106A, 106B, or 106C may transmit or report their location within vehicle 101 to controller 104 using on-battery circuitry (not shown). Alternatively, sensing subsystems 110A, 110B, 110C, or 110D may include sensors or other circuitry to determine the location of batteries 106A, 106B, 106C, or 106D within vehicle 101. In still another embodiment, controller 104 may access the location of batteries 106A, 106B, or 106C from a memory device (not shown) in vehicle 101, the location of batteries 106A, 106B, 106C, or 106D having been stored in the memory device during vehicle's 101 manufacture.

Controller 104 may dynamically or selectively determine which of batteries 106A, 106B, or 106C, or which combination of batteries 106A, 106B, or 106C, to load or couple to motor 102 based, at least in part, on having determined a battery charge level for each of batteries 106A, 106B, 106C. Batteries 106A, 106B, or 106C may transmit or report their battery charge to controller 104 using on-battery circuitry (not shown). Alternatively, sensing subsystems 110A, 110B, 110C, or 110D may include sensors or other circuitry to determine charge level of batteries 106A, 106B, 106C, or 106D within vehicle 101.

Controller 104 may dynamically or selectively determine which of batteries 106A, 106B, or 106C, or which combination of batteries 106A, 106B, or 106C, to load or couple to motor 102 additionally based on other sensing control signals 208, e.g., acceleration, speed, instantaneous power requirements, battery charge, and the like. For example, controller 104 may dynamically or selectively load or couple battery 106A to motor 102 based on battery 106A being located closer to motor 102 and based on vehicle 101 operating in a condition that necessitates a large current draw or large instantaneous power, e.g., in situations where vehicle 101 is accelerating as indicated by control signal 208. By doing so, vehicle 101 would avoid heat and energy losses due to the distance between battery 106A and motor 102 to thereby improve operational efficiency.

For another example, controller 104 may dynamically or selectively load or couple battery 106C to motor 102 based on battery 106C being located farther from motor 102 (at least relative to battery 106A) and based on vehicle 101 operating in a condition that necessitates a more steady current draw or steady power, e.g., in situations where vehicle 101 is at a complete stop, cruising at a fixed speed, or coasting as indicated by control signal 208. By doing so, vehicle 101 may conserve the charge on closer-located battery 106A for situations in which heat and energy losses play a larger role in improving operational efficiency, e.g., when vehicle 101 is rapidly accelerating and thus requiring a higher instantaneous power and attendant higher current draw from battery 106A.

Vehicle 101 may include a single battery 106A or plural batteries 106A, 106B, and 106C located at various locations. In situations where vehicle 101 includes plural batteries 106A, 106B, and 106C, controller 104 may map batteries 106A, 106B, and 106C to certain zones. For example, battery 106A may be in a first zone 120A while batteries 106B and 106C may be in a second zone 120B. A person of ordinary skill in the art should recognize that any number of zones are possible within vehicle 101. Under certain operating conditions, e.g., rapid acceleration, controller 104 may dynamically or selectively load or couple batteries 106B and 106C in second zone 120B to motor 102. Conversely, under certain other operating conditions, e.g., complete stop, cruising at a fixed speed, or coasting, controller 104 may dynamically or selectively load or couple battery 106A in first zone 120A to motor 102.

In an embodiment, sensing control signal system 206 may generate sensing control signal 208 representative of a power requirement of vehicle 101 in response to determining an acceleration of vehicle 101 using, e.g., a throttle position sensor or a speed sensor within sensing circuit 204. Controller 104 may receive sensing control signal 208 representative of a power requirement of vehicle 101 and may, in turn, dynamically or selectively load or couple battery 106A, 106B, 106C, or some combination thereof, to motor 102. In an embodiment, controller 104 may further dynamically or selectively load or couple battery 106A, 106B, or 106C to motor 102 additionally based on a location of battery 106A, 106B, or 106C within vehicle 101. For example, sensing control signal system 206 may generate a sensing control signal 208 representative of vehicle 101 operating at a fixed speed (or at a complete stop) as determined by sensing or other circuitry in sensing circuit 204. In this circumstance, controller 104 may dynamically or selectively load or couple battery 106C to motor 102 even though battery 106C may be located farthest from motor 102. This is because vehicle 101 does not have a high instantaneous power requirement when operating at a fixed speed (or at a complete stop) that may counsel controller 104 to load or couple battery 106A to motor 102 since battery 106A is located closer to motor 102. Such dynamic or selective loading or coupling of batteries 106A, 106B, or 106C to electric motor 102 may improve operational efficiency of vehicle 101. In similar manner, controller 104 may dynamically or selectively load or couple batteries 106A, 106B, or 106C to motor 102 based on corresponding charge level, environmental conditions, road conditions, and other like operating conditions.

Figure 3:
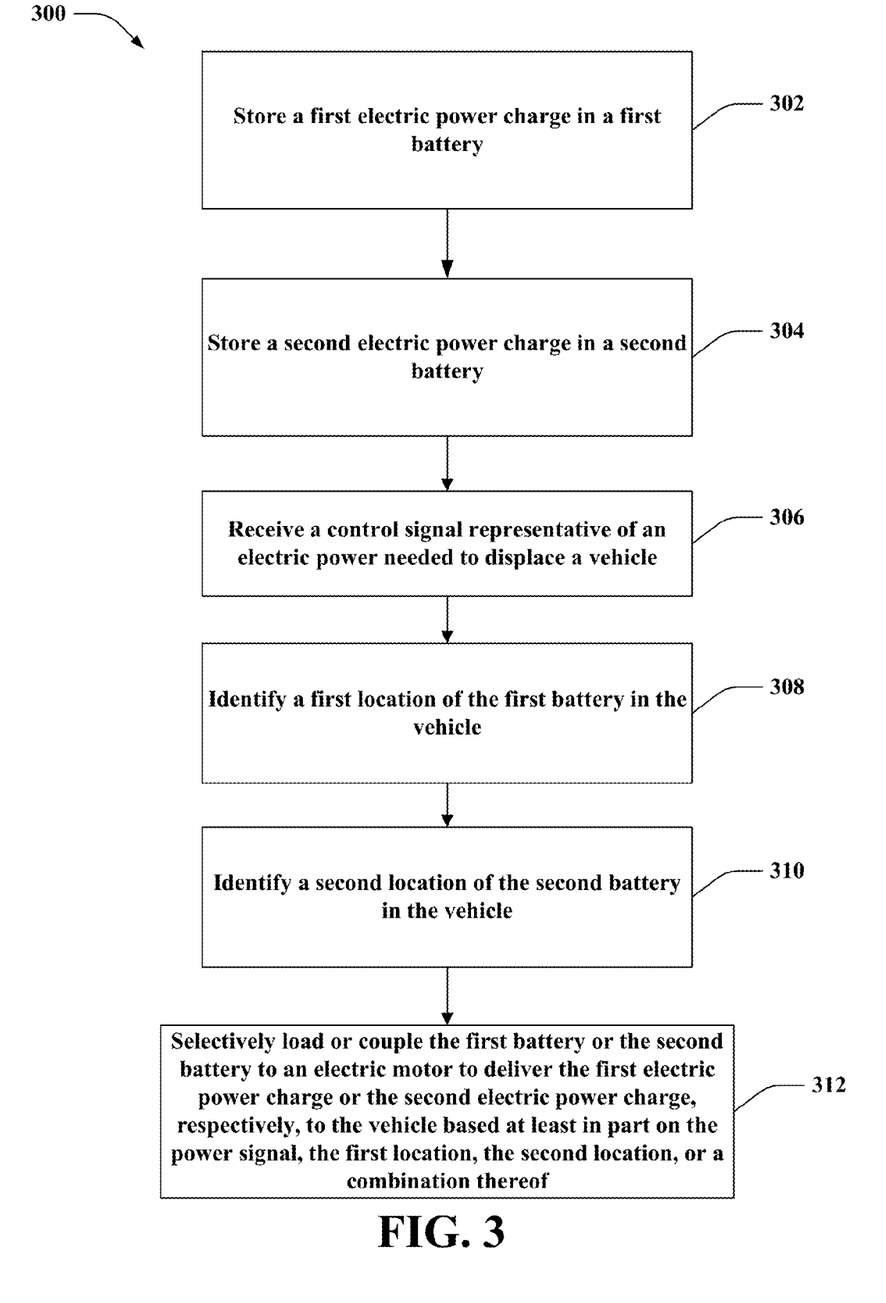
FIG. 3 diagrams an embodiment of a method for dynamically loading or coupling a battery to an electric motor according to the present disclosure.

FIG. 3 diagrams an embodiment of a method 300 for dynamically or selectively loading or coupling a battery to an electric motor according to the present disclosure. Referring to FIG. 3, at 302, method 300 includes storing a first electric power charge in a first battery and, at 304, storing a second electric power charge in a second battery. At 306, method 300 further includes receiving a control signal representative of an electric power needed to displace a vehicle. At 308, method 300 further includes identifying a first location of a first battery in the vehicle and, at 310, identifying a second location of a second battery in the vehicle. At 312, method 300 further includes dynamically or selectively loading or coupling the first battery or the second battery to an electric motor to deliver the first battery charge or the second battery charge, respectively, to the motor based at least in part on the power signal, first location, the second location, or a combination thereof.

Figure 4:
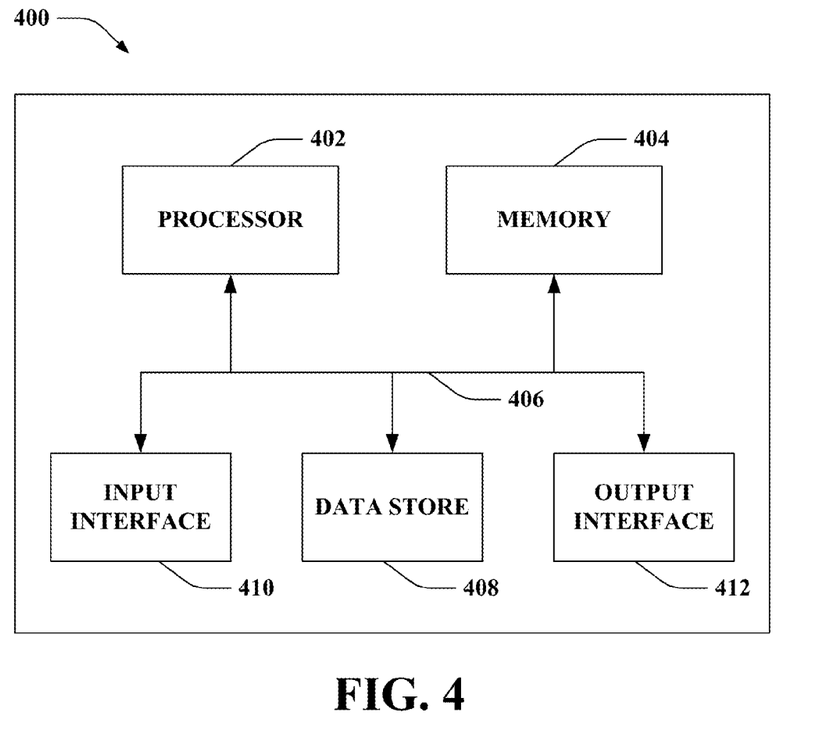
FIG. 4 diagrams an embodiment of controller according to the present disclosure.

FIG. 4 diagrams an embodiment of controller 400 according to the present disclosure. Referring now to FIG. 4, a high-level illustration of an exemplary controller 400 that can be used in accordance with the systems and methodologies disclosed herein is illustrated. In particular, controller 400 may exemplify an embodiment of controller 104 shown in FIGS. 1A and 1B.

Controller 400 may include at least one processor 402 that executes instructions that are stored in a memory 404. The instructions may be, for instance, instructions for implementing functionality described as being carried out by one or more components discussed above or instructions for implementing one or more of the methods described above. Processor 402 may access memory 404 by way of a system bus 406. In addition to storing executable instructions, memory 404 may also store application data, video stream(s), and the like.

Controller 400 may additionally include a data store 408 that is accessible by processor 402 by way of system bus 406. Data store 408 may include executable instructions, application data, video stream(s), and the like. Controller 400 may also include an input interface 410 that allows external devices to communicate with the controller 400. For instance, input interface 410 may receive instructions from an external computer device, from a user, from other components in system 100 (FIGS. 1A or 1B). Controller 400 may also include an output interface 412 that interfaces controller 400 with one or more external devices. For example, controller 400 may display text, images, and the like by way of the output interface 412. In an embodiment, controller 400 may further include a display screen (not shown).

It is contemplated that the external devices that communicate with controller 400 via input interface 410 and output interface 412 and/or the display screen (not shown) of may be part of an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with controller 400 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that controller 400 may be a distributed system. Thus, for instance, several devices may be in communication by way of a network connection and may collectively perform tasks described as being performed by controller 400.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

It will also be appreciated by persons of ordinary skill in the art that the present disclosure is not limited to what has been particularly shown and described hereinabove. Rather, the scope of the present disclosure includes both combinations and sub-combinations of the various features described hereinabove as well as modifications and variations which would occur to such skilled persons upon reading the foregoing description. Thus the disclosure is limited only by the appended claims.

The invention claimed is:

1. A system, comprising:
an electric motor to displace a vehicle;
a first battery to store a first electric power charge and located at a first location in the vehicle;
a second battery to store a second electric power charge and located at a second location in the vehicle; and
a plurality of sensing subsystems configured to generate a corresponding plurality of sensing subsystem control signals including an acceleration signal representative of an acceleration of the vehicle;
a controller to dynamically load the first battery or the second battery to deliver the first electric power charge or the second electric power charge, respectively, to the electric motor based at least in part on a power signal that indicates an electric power needed by the electric motor to displace the vehicle, the acceleration signal, or a combination thereof.

2. The system of claim 1, wherein the first location is different from the second location.

3. The system of claim 2, wherein the controller is further configured to dynamically load the first battery to the electric motor based at least in part on a distance from the electric motor to the first location.

4. The system of claim 1, wherein the controller is further configured to dynamically load the first battery or the second battery when the acceleration signal exceeds a predetermined threshold.

5. The system of claim 1, wherein the plurality of sensing subsystem control signals includes a first battery state of charge signal representative of a first battery state of charge for the first battery and a second battery state of charge signal representative of a second battery state of charge for the second battery; and
wherein the controller is further configured to dynamically load the first battery or the second battery to the electric motor based at least in part on the first battery state of charge signal or the second battery state of charge signal.

6. The system of claim 1, wherein the plurality of sensing subsystem control signals includes a temperature signal representative of an ambient temperature; and
wherein the controller is further configured to dynamically load the first battery or the second battery to the electric motor based at least in part on the temperature signal.

7. A system, comprising:
an electric motor to displace a vehicle;
a first battery to store a first electric power charge and located at a first location in the vehicle;
a second battery to store a second electric power charge and located at a second location in the vehicle;
a plurality of sensing subsystems configured to generate a corresponding plurality of sensing subsystem control signals including a road condition signal representative of a road condition on which the vehicle travels; and
a controller to dynamically load the first battery or the second battery to deliver the first electric power charge or the second electric power charge, respectively, to the electric motor based at least in part on a power signal that indicates an electric power needed by the electric motor to displace the vehicle, the road condition signal, or a combination thereof.

8. A method, comprising:
storing a first electric power charge in a first battery;
storing a second electric power change in a second battery;
receiving a power signal representative of an electric power needed by an electric motor to displace a vehicle;
generating a plurality of sensing subsystem control signals using a corresponding plurality of sensing control subsystems, the plurality of subsystem control signals including an instantaneous power requirement signal representative of an instantaneous power requirement of the vehicle; and
selectively loading the first battery or the second battery to deliver the first electric power charge or the second electric power charge, respectively, to the electric motor based at least in part on the power signal, at least one of the plurality of sensing subsystem control signals, the instantaneous power requirement signal, or a combination thereof.

9. The method of claim 8, further comprising:
identifying a first location of the first battery in the vehicle;
identifying a second location of the second battery in the vehicle; and
selectively loading the first battery or the second battery to deliver the first electric power charge or the second electric power charge, respectively, to the electric motor based at least in part on the first location or the second location.

10. The method of claim 9, further comprising:
determining a first distance from the first location to the motor;
determining a second distance from the second location to the motor; and
selectively loading the first battery or the second battery to deliver the first electric power charge or the second electric power charge, respectively, to the electric motor based at least in part on the first distance or the second distance.

11. The method of claim 8, further comprising:
selectively loading the first battery or the second battery when the instantaneous power requirement signal exceeds a predetermined threshold.

12. The method of claim 8, further comprising:
generating a first battery state of charge signal representative of a first battery state of charge for the first battery;
generating a second battery state of charge signal representative of a second battery state of charge for the second battery; and
selectively loading the first battery or the second battery to the electric motor based at least in part on the first battery state of charge signal or the second battery state of charge signal.

13. The method of claim 8, further comprising:
generating a temperature signal representative of an ambient temperature; and
selectively loading the first battery or the second battery to the electric motor based at least in part on the temperature signal.

14. A method, comprising:
storing a first electric power charge in a first battery;
storing a second electric power change in a second battery;
receiving a power signal representative of an electric power needed by an electric motor to displace a vehicle;
generating a plurality of sensing subsystem control signals using a corresponding plurality of sensing control subsystems, the plurality of subsystem control signals including a road condition signal representative of a road condition on which the vehicle travels; and
selectively loading the first battery or the second battery to deliver the first electric power charge or the second electric power charge, respectively, to the electric motor based at least in part on the power signal, the road condition signal, or a combination thereof.

15. A battery control system for an electric vehicle, comprising:

a plurality of batteries each configured to store a corresponding electric power charge;

a plurality of sensing control subsystems to generate a corresponding plurality of sensing subsystem control signals including an acceleration signal representative of an acceleration of the vehicle;

a controller to selectively load at least one of the plurality of batteries to deliver the corresponding electric power charge to an electric motor based at least in part on a power signal, at least one of a plurality of battery location signals corresponding to the plurality of batteries, the acceleration signal, or a combination thereof;

wherein the power signal is representative of a power requirement of the electric motor to propel the electric vehicle; and wherein the plurality of battery location signals identifies a location of each of the plurality of batteries.

16. The battery control system of claim 15, wherein the plurality of sensing subsystem control signals including an instantaneous power requirement signal representative of an instantaneous power requirement of the vehicle or a road condition signal representative of a road condition on which the vehicle travels; and wherein the controller is further configured to selectively load the at least one of the plurality of batteries to the electric motor based at least in part on the instantaneous power requirement signal, the road condition signal, or a combination thereof.

* * * * *